Sept. 1, 1970     S. T. BRANCALEONE     3,526,420

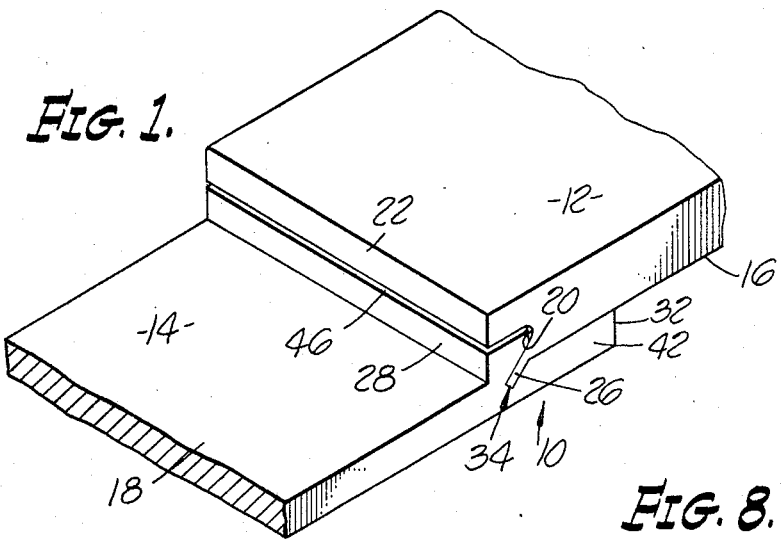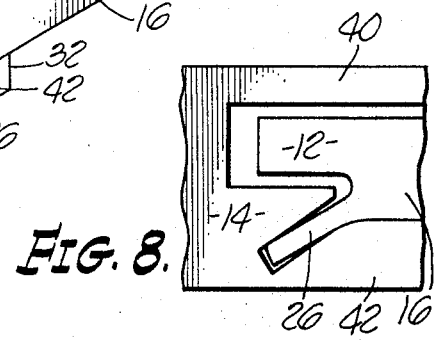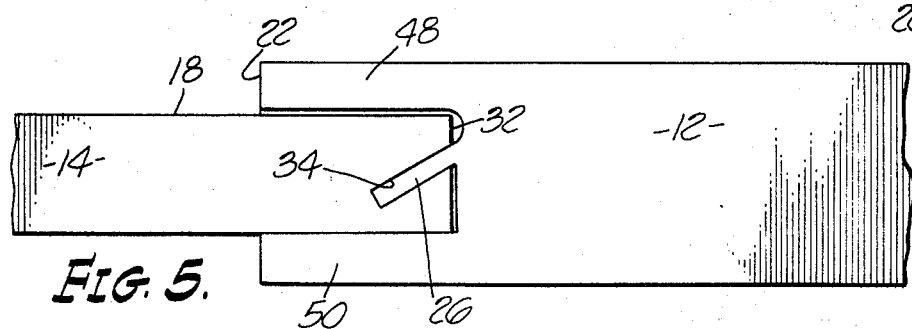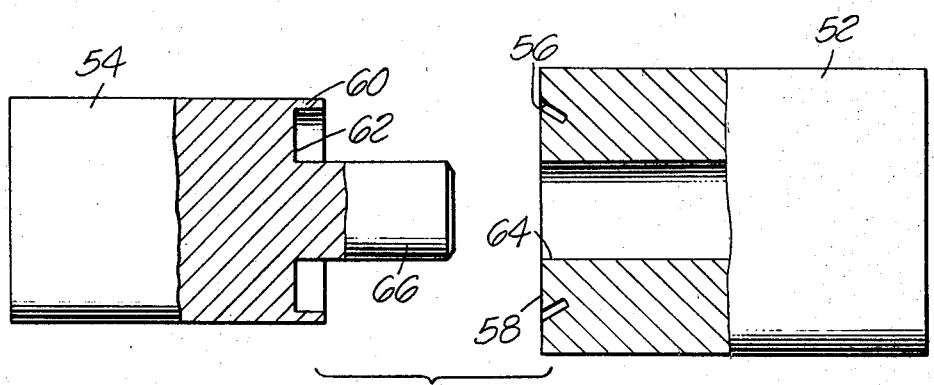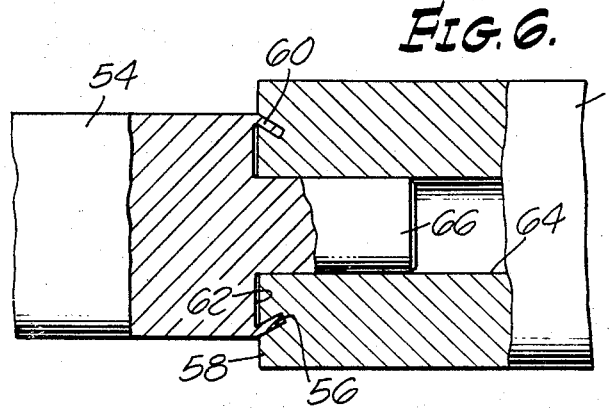

SELF-LOCKING SEAM

Filed May 22, 1968     2 Sheets-Sheet 2

INVENTOR.
S. T. BRANCALEONE
BY Harry S. Hertz
ATTORNEY

United States Patent Office 3,526,420
Patented Sept. 1, 1970

3,526,420
SELF-LOCKING SEAM
Salvatore Thomas Brancaleone, Temple City, Calif., assignor to International Telephone and Telegraph Corporation, New York, N.Y., a corporation of Delaware
Filed May 22, 1968, Ser. No. 731,176
Int. Cl. F16b 11/00
U.S. Cl. 287—189.36    6 Claims

ABSTRACT OF THE DISCLOSURE

A self-locking seam for a pair of generally axially aligned members wherein opposing edges of the respective members are formed with an angled groove and an axially extending laterally deformable lip so that when the members are forced axially together the lip deforms laterally to become wedged in the angled groove and, thus, retain the members against axial separation. The seam may be embodied on both flat and tubular members which are desired to be permanently locked together.

BACKGROUND OF THE INVENTION

This invention relates generally to a mechanical seam and, more particularly, to a self-locking seam which serves to retain two members against axial separation, and to the method of fabricating the same.

A widely used mechanical seam for locking two members together against axial separation is the "formed over" seam which is fabricated in two separate operations requiring the use of rather expensive equipment utilizing external rolling wheels, forming tools, etc. While this type of seam is entirely satisfactory, it would obviously be advantageous to have a seam which functions essentially in the same manner as the "formed over" seam yet is capable of fabrication in a single operation and without the requirement of unusual and expensive tools.

SUMMARY OF THE INVENTION

According to the principal aspect of the present invention, there is provided a mechanical self-locking seam which constitutes a considerable departure from the conventional "formed over" seam, yet is as reliable as the conventional seam, and is formed without the use of expensive rolling wheels, forming tools, etc., such as are required in fabricating the conventional "formed over" seam. The seam of the present invention includes an angled groove which is formed along an edge of a first member and a laterally deformable normally axially extending lip which is located adjacent to the edge of a second member that is aligned with the first member. A linear force is applied to the members to move them relatively toward each other. The force applied to the members is sufficiently great so that when the lip engages the angled groove, the lip deforms laterally and becomes wedged into the groove thereby retaining the two members against axial separation. It has been found that the self-locking seam of the present invention is at least as structurally reliable as the "formed over" seam, yet may be rapidly and inexpensively formed in a single operation by merely applying a linear force to the two members embodying the angled groove and deformable lip.

Other objects, aspects, and advantages of the invention will become apparent from the following description taken in connection with the accompanying drawings.

BRIEF DESCRIPTION OF THE DRAWINGS

FIG. 1 is a fragmentary perspective view of a pair of flat panel members which are interlocked by one form of the self-locking seam of the present invention;

FIG. 5 is a side view of the modified form of the seam as applied to a pair of flat panel members;

FIG. 6 is a partial longitudinal section through a pair of separated tubular sections embodying a modified form of the self-locking seam of the present invention;

FIG. 7 is a partial longitudinal section similar to FIG. 6, but showing the two tubular sections interlocked by the seam of the invention; and FIG. 8 is a side view of another alternative embodiment of the device of FIG. 1.

DESCRIPTION OF THE PREFERRED EMBODIMENTS

Figure 2:
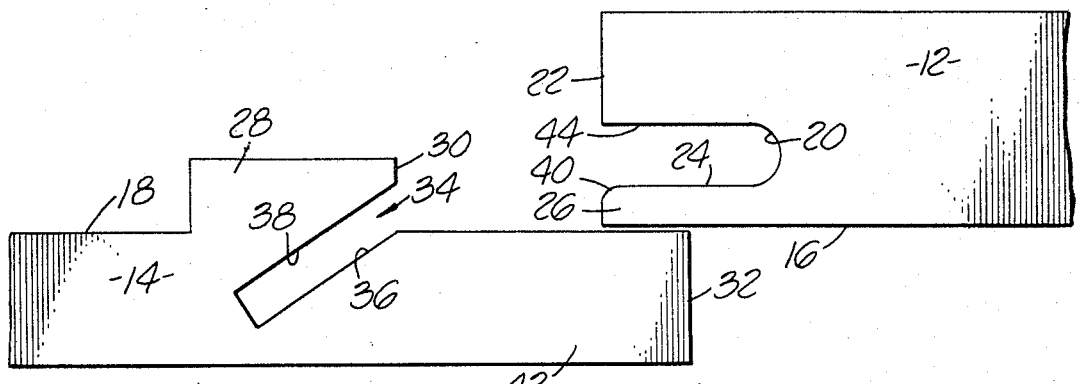
FIG. 2 is a side view of the panel members illustrated in FIG. 1 with the two members shown separated.
Figure 3:
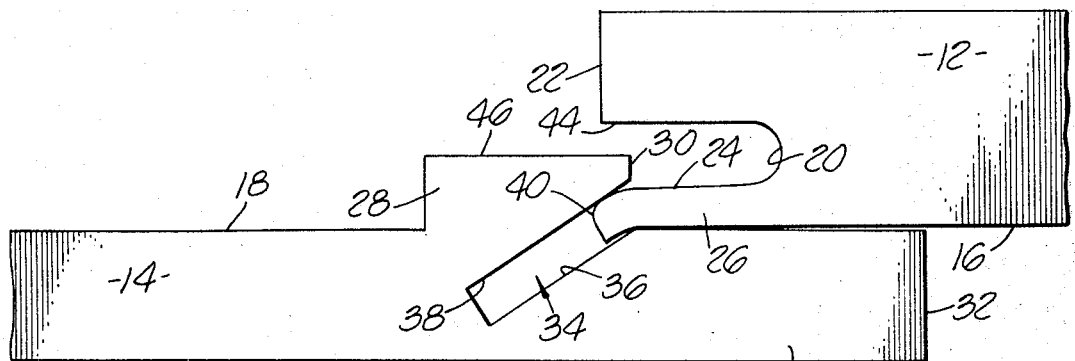
FIG. 3 is a side view similar to FIG. 2 but illustrating the deformable lip of the seam commencing engagement with the angled groove thereof.

Referring now to the drawings in detail, there is illustrated in FIGS. 1 to 4 one form of the self-locking seam 10 of the present invention as applied to a pair of generally flat panel members 12 and 14 for interlocking the members against the axial separation. The members 12 and 14 are metallic but could be formed of other materials which are capable of being formed, such as certain plastics. The two members are generally axailly aligned, at least to the extent that when they are interlocked by the seam 10 the lower surface 16 of the member 12 is coplaner with the upper surface 18 of the member 14.

A generally axially extending groove 20 is formed in the panel member 12 and opens at the forward edge 22 thereof. This groove preferably extends the full length of the edge 22. The lower surface 24 of the groove is sufficiently close to the lower surface 16 of the panel member 12 so as to define therebetween a laterally deformable axially extending lip 26.

A laterally extending rib 28 projects upwardly from the upper surface 18 of the panel member 14. The forward edge or shoulder 30 of this rib is spaced behind the forward-most edge 32 of member 14. A forming groove 34 which extends at an acute angle to the upper surface 18 of the member 14 extends laterally across the member and opens at the edge 30 of the rib 28. The lower surface 36 of the groove 34 terminates at the junction of the edge 30 and the upper surface 18 of the panel member 14, while the upper surface 38 of the groove is spaced sufficiently from the surface 36 so as to be capable of receiving therein the lip 26 on the panel member 12. The depth of the groove 34 is such as to permit complete insertion of the lip 26 therein as will be seen later. The groove 20 in the panel member 12 and the groove 34 in rib 28 may be formed by machining, but preferably are provided by extruding the panel members so as to have the desired configuration.

To form the seam 10, the panel members 12 and 14 are positioned as shown in FIG. 2 with the lower surface 16 of the panel member 12 resting upon the upper surface 18 of the panel member 14. The two members are moved axially relative to each other so that the lip 26 will engage in the angled groove 34. The corner 40 at the junction between the lower surface 24 of groove 20 and the outer edge of the lip 26 is slightly rounded so that when the corner engages the upper surface 38 of the groove 34, the lip will deform downwardly as seen in FIG. 2 upon application of linear force between the members. The further application of linear force will cause the lip to be sufficiently laterally deformed so as to be wedged into engagement with the walls of the groove 34, thus completing the self-locking seam of the invention which retains the members 12 and 14 against axial separation.

It has been found that the amount of force required to unlock the seam is considerably greater than that required to form the seam. This is due to the fact that the seam performance is based upon essentially a non-reversible mechanical advantage principle. When the locking lip 26 is forced into the angled groove 34, a definite mechanical advantage exists to permit the lip to be wedged into the groove. When the seam is fully joined and a withdrawal or reverse force is applied to the members 12 and 14, the mechanical advantage shifts reference point and most, if not all, of the advantage is lost. The holding principle is similar to that of the typical "formed over" seam except that no special forming tools are required to form the seam of the present invention, and, most importantly, only a single operation requiring the application of linear force is required in the present invention to form the seam.

It can be appreciated that the forward portion 42 of the panel member 14 which extends between the edge 30 of the rib 28 and the forward-most edge 32 provides a guide for facilitating the insertion of the lip 26 into the angled groove 34. The engagement of the upper surface of the forwardly extending portion 42 of panel member 14 with the lower surface 16 of panel member 12 also serves to strengthen the seam by preventing angular motion between the two members in the vertical direction as viewed in FIGS. 2 to 4.

Figure 4:
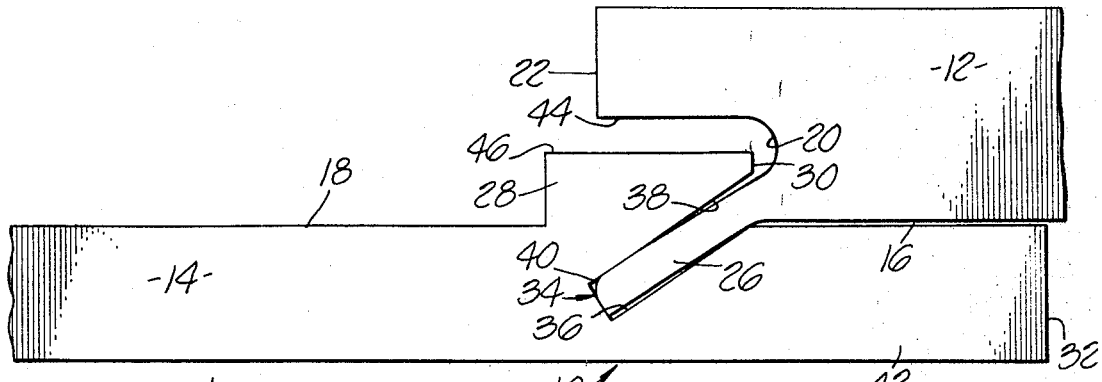
FIG. 4 is a side view similar to FIGS. 2 and 3 but showing the deformable lip completely wedged into engagement within the angled groove of the seam.

As best seen in FIG. 4, the upper surface 44 of the groove 20 is spaced sufficiently above the lower surface 24 thereof so that when the two members 12 and 14 are interlocked by the seam 10, the upper surface 44 is spaced from the upper surface 46 of the rib 28 allowing clearance between the surfaces 44 and 46. Also, if desired, a resilient seal such as an O-ring, not shown, may be positioned at the closed end of the groove 20, which is compressed by the edge 30 when the latter is in the groove 20.

A modified form of the self-locking seam of the present invention as applied to a pair of flat panel members is illustrated in FIG. 5 wherein like reference characters are utilized to designate corresponding elements. In this embodiment, the angled groove 34 opens at the forward-most edge 32 of the panel member 14 thus eliminating the raised rib 28 utilized in the embodiment of the invention illustrated in FIGS. 1 to 4. Also, in contrast to the first embodiment of the invention in the embodiment illustrated in FIG. 5 a pair of upper and lower non-deformable axially extending lips 48 and 50 are provided on panel member 12. These lips extend forwardly so as to overlap the upper and lower surfaces of the panel member 14. As a consequence, the lips 48 and 50 cooperate with the member 14 in such a manner as to prevent angular motion of the members in either relative upward or downward directions and also serve to protect the deformable lip 26.

Reference is now made to FIGS. 6 and 7 which show the self-locking seam of the present invention as applied to a pair of coaxial tubular sections 52 and 54. In this embodiment, the angled groove 56 of the seam has a conical configuration with the outer edge thereof opening at the forward edge of face 58 of the tubular section 52 and with the walls of the groove flaring radially inwardly away from the edge 58. The tubular section 54 is formed with a normally cylindrical radially deformable lip 60 which extends forwardly from the face 62 of the tubular section and has a diameter equal to the diameter of the groove 56 at the point of its opening at the edge 58. An axially extending cylindrical bore 64 is provided in the tubular section 52 which is adapted to receive a complementary cylindrical boss 66 which extends forwardly from the face 62 of the tubular section 54. The boss 66 and bore 64 thus constitute guide means for facilitating engagement of the cylindrical lip 60 into the groove 56. The self-locking seam in the embodiment illustrated in FIGS. 6 and 7 is formed generally in the same manner as in the previous embodiments in that the boss 66 is inserted into the bore 64 and a linear force is applied between the two sections 52 and 54 to wedge the deformable lip 60 into the conical groove 56 as seen in FIG. 7. The lip will cooperate with the walls of the groove 56 in a similar fashion to the lip 26 cooperating with the walls of the groove 34 in the embodiments illustrated in FIGS. 1 to 5 to retain the tubular sections 52 and 54 against axial separation.

It is to be understood that the conical groove 56 in the tubular section 52 may be flared radially outwardly rather than radially inwardly from the forward edge 58 with the seam formed thereby functioning in the same manner as that described above in connection with the seam illustrated in FIGS. 6 and 7.

From the foregoing, it can be seen that there is provided by the present invention a self-locking seam which is inexpensive, quickly formed, reliable, and does not require the use of expensive and complicated equipment employing rolling wheels, forming tools, etc., as required for the conventional "formed over" seam. In addition, the seam of the present invention requires only a single operation and the application of only a linear force, in contrast to the conventional "formed over" seam which requires two operations and the application of forces applied in various angular directions. In addition, the self-locking seam of the present invention, besides being mechanically rugged, has inherent aesthetic benefits in that the formed material, namely the deformable lips 26 and 60, are concealed from view.

While the seam of the present invention may be formed so as to prevent lateral movement of the members to which it is applied as well as preventing axial separation thereof, it is understood that by a judicious selection of the position of the locking groove and deformable lip, a slip joint may be provided which would permit relative lateral movement of the panel members 12 and 14 and relative rotational movement of the tubular sections 52 and 54, yet not impair the axial retention characteristics of the seams. A slip joint annular seam of the type illustrated in FIGS. 6 and 7 could, therefore, be employed providing a low cost coupling nut retention system for electrical connectors, for example, thus, eliminating the necessity of form overs, snap rings, etc. The addition of a dry lubricant to the seam would obviously enhance the relative movement between the members embodying the seam components.

FIG. 8 depicts an alternative embodiment of the device of FIG. 1 wherein the two sections to be joined may be retained against axial as well as either relative upward or downward directional movement. In FIG. 8 a second forward extending portion 40 is provided which is integral with the panel member 14, thus overlapping both sides of the panel member 12. Therefore, the portions 40 and 42 cooperate with the member 12 in such a manner as to prevent angular motion of the members in either relative upward or downward direction.

While the present invention has been described specifically in connection with the application of the seam with flat panel members and tubular sections, it is understood that the invention could also be utilized with other shaped members, such as members having cross-sections which are square, rectangular, elliptical, etc., with the same advantages discussed above except for the obvious limitation that members having square, rectangular, or elliptical cross-sections could not function as a slip joint.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent structures, methods, and devices.

What is claimed is:

1. A self-locking seam comprising: first and second generally axially aligned members being flat and parallel having edges facing one another; an angled groove in said first member extending at an acute angle with respect thereto and opening at said edge thereof; a laterally deformable normally axially extending lip adjacent to the edge of said second member; said lip being laterally deformed so as to be wedged in said angled groove to retain said members against axial separation, and normally lying in a plane parallel to said first member and being deformed therefrom into wedged engagement with the walls of said groove; one of said members including a pair of non-deformable lips extending forwardly in overlapping relationship with the upper and lower surfaces of the other member so as to prevent relative angular motion of said members.

2. A self-locking seam comprising: first and second generally axially aligned members formed of coaxial tubular sections and having edges facing one another; an angled groove in said first member opening at said edge thereof; a laterally deformable normally axially extending lip adjacent to the edge of said second member said groove having a conical configuration and opening at the annular edge of one of said sections; and said lip being a normally generally cylindrical portion deformed radially into wedged engagement with the walls of said groove; and said lip being laterally deformed so as to be wedged in said angled groove to retain said members against axial separation.

3. A self-locking seam as set forth in claim 2 wherein one of said sections is formed with an axially extending cylindrical bore opening at a forwardly facing surface thereof, and the other section embodies a cylindrical forwardly extending boss complementary to said bore and slidably received therein.

4. A self-locking seam comprising: first and second generally axially aligned members having edges facing one another; an angled groove in said first member opening at said edge thereof; a laterally deformable normally axially extending lip adjacent to the edge of said second member; and said lip being laterally deformed so as to be wedged in said angled groove to retain said members against axial separation, said members including complementary engageable guide means thereon other than said lip and groove for aligning said lip with said groove.

5. A self-locking seam as set forth in claim 4 wherein the engagement of said lip in said groove is such as to permit relative lateral slidable movement of said members while retaining said members against axial separation.

6. A self-locking seam comprising: first and second generally axially aligned members having edges facing one another, one of said members including an axially extending forward portion overlapping a forward portion of the other member; an angled groove in said first member opening at said edge thereof; a laterally deformable normally axially extending lip adjacent to the edge of said second member; and said lip being laterally deformed so as to be wedged in said angled groove to retain said members against axial separation.

References Cited
UNITED STATES PATENTS

| | | |
|---|---|---|
| 2,362,902 | 11/1944 | Jansen. |
| 2,374,270 | 4/1945 | Brock _____ 287—119 |
| 2,486,769 | 11/1949 | Watson _____ 29—521 X |
| 2,981,669 | 4/1961 | Brand et al. |
| 3,019,733 | 2/1962 | Braid _____ 29—521 X |
| 3,030,850 | 4/1962 | Minor et al. |

DAVID J. WILLIAMOWSKY, Primary Examiner

W. L. SHEDD, Assistant Examiner

U.S. Cl. X.R.

29—509, 511, 514, 521; 52—588; 287—103